United States Patent

Ruster et al.

(10) Patent No.: US 12,504,456 B2
(45) Date of Patent: Dec. 23, 2025

(54) QUANTUM SENSOR SYSTEM FOR SENSING ELECTROMAGNETIC RADIATION

(71) Applicants: Rohde & Schwarz GmbH & Co. KG, Munich (DE); University of Basel, Basel (CH)

(72) Inventors: Thomas Ruster, Munich (DE); Philipp Treutlein, Basel (CH); Yongqi Shi, Basel (CH); Melvyn Ho, Munich (DE)

(73) Assignees: Rohde & Schwarz GmbH & Co. KG, Munich (DE); University of Basel, Basel (CH)

( * ) Notice: Subject to any disclaimer, the term of this patent is extended or adjusted under 35 U.S.C. 154(b) by 468 days.

(21) Appl. No.: 18/328,126

(22) Filed: Jun. 2, 2023

(65) Prior Publication Data
US 2024/0402230 A1    Dec. 5, 2024

(51) Int. Cl.
*G01R 29/08* (2006.01)
(52) U.S. Cl.
CPC ................. *G01R 29/0878* (2013.01)
(58) Field of Classification Search
CPC ............ G01R 29/0821; G01R 29/0878; G01R 29/0892
See application file for complete search history.

(56) References Cited

U.S. PATENT DOCUMENTS

| | | | | |
|---|---|---|---|---|
| 2009/0146666 | A1* | 6/2009 | Ohtsuka | G01R 31/1272 324/96 |
| 2016/0363617 | A1* | 12/2016 | Anderson | G01R 29/0885 |
| 2019/0187198 | A1* | 6/2019 | Anderson | G01R 29/0878 |
| 2021/0109010 | A1* | 4/2021 | Ruster | G01R 29/0878 |
| 2021/0349142 | A1* | 11/2021 | Winkler | G01R 31/2806 |
| 2022/0196716 | A1* | 6/2022 | Anderson | G01R 29/0892 |
| 2023/0137266 | A1* | 5/2023 | McBride | G01V 8/005 250/389 |
| 2023/0160938 | A1* | 5/2023 | Ruster | G01R 29/0892 349/86 |

* cited by examiner

*Primary Examiner* — Eman A Alkafawi
*Assistant Examiner* — Suresh K Rajaputra
(74) *Attorney, Agent, or Firm* — Studebaker Brackett PLLC

(57) ABSTRACT

The present disclosure relates a quantum sensor system for sensing electromagnetic, EM, radiation. The quantum sensor comprises an element configured to shape and/or focus the EM radiation to generate an inhomogeneous field distribution in an area; at least two quantum sensors which are arranged at different locations in the area, each of the quantum sensors comprising a sensing volume which is configured to interact with the EM radiation; at least one detector configured to detect an interaction of the EM radiation with each sensing volume, wherein the interaction is indicative of a power level of the EM radiation at the location of the respective sensing volume; and a processor which is configured to determine a signal characteristic of the EM radiation based on a correlation of the power levels at the locations of the sensing volumes.

19 Claims, 6 Drawing Sheets

QUANTUM SENSOR SYSTEM FOR SENSING ELECTROMAGNETIC RADIATION

TECHNICAL FIELD

The disclosure relates to quantum sensor systems for sensing electromagnetic radiation and to corresponding methods for sensing electromagnetic radiation.

BACKGROUND ART

Within the last years, there has been a lot of interest in sensing electromagnetic radiation (EM) with quantum systems. The most common quantum systems include ground-state atoms, excited atoms (especially to Rydberg states), or atom-like systems such as NV defects in diamonds. For instance, a quantum sensor which employs such a quantum system can detect EM radiation by resonant transitions between two energy states in the quantum system.

Depending on the particular quantum system and the readout technique, most interactions show a saturation behavior for high powers in the electromagnetic radiation. The reason for this might be decoherence effects caused by a large number of Rabi oscillations, excitation of already saturated two-level systems, or interactions with other energy levels. This saturation behavior usually limits the dynamic range of the sensor.

Another problematic effect is power broadening. Power broadening describes the effect that atomic transitions will broaden in frequency space if a high-power electromagnetic wave is applied. This means that transitions at nearby frequencies will respond as well. When analyzing the spectrum of a signal with power broadening, it may not be possible to distinguish a narrowband high-power signal from a broadband lower-power signal.

SUMMARY

Thus, there is a need to provide an improved quantum sensor system which allows for a higher dynamic range.

This is achieved by the embodiments provided in the enclosed independent claim. Advantageous implementations of the present disclosure are further defined in the dependent claims.

According to a first aspect, the present disclosure relates to a quantum sensor system for sensing electromagnetic, EM, radiation. The quantum sensor system comprises: an element configured to shape and/or focus the EM radiation to generate an inhomogeneous field distribution in an area; at least two quantum sensors which are arranged at different locations in the area, each of the quantum sensors comprising a sensing volume which is configured to interact with the EM radiation; at least one detector configured to detect an interaction of the EM radiation with each sensing volume, wherein the interaction is indicative of a power level of the EM radiation at the location of the respective sensing volume; and a processor which is configured to determine a signal characteristic of the EM radiation based on a correlation of the power levels at the locations of the sensing volumes.

This achieves the advantage that a quantum sensor system with a high dynamic range can be provided. Due to its plurality of quantum sensors arranged at different locations of the inhomogeneous field, the system can measure radiation from the same source at different power levels (i.e., amplitudes), e.g., by means of different transition strengths in the sensing volumes.

Each of the quantum sensors can comprise a dedicated detector. However, there can also be one detector for multiple quantum sensors, for instance if the sensing volumes of these sensors are arranged directly adjacent or in close proximity to each other.

The inhomogeneous field distribution may refer to an inhomogeneous local distribution of an amplitude of the EM radiation (i.e., of the waves of the EM field) in the area. For instance, the element can cause a gradual or instantaneous change of the amplitude of the waves of the EM radiation in the area in which the quantum sensors are arranged, e.g. due to a partial absorption of the EM radiation, such that the sensing volumes of both quantum sensors receive the EM radiation with a different amplitude.

The area can be a sensing area in which the quantum sensors are arranged.

In an implementation form, the quantum sensor system further comprises a signal source which is configured to generate the EM radiation based on a physical quantity to be analyzed.

For instance, the physical quantity can be an electric or magnetic field, a pressure or a temperature. By sensing the EM radiation, information on the physical quantity can be obtained. The signal source may comprise an antenna for generating and/or transmitting the EM radiation.

Instead of having a signal source which generates the EM radiation based on the physical quantity, it is also possible to measure the physical quantity directly with the quantum sensor. This is possible, because most quantum systems are directly influenced by the physical quantities (E/B-field, pressure, temperature) even if no "converter" for converting the quantity to EM radiation (e.g., in the form of the signal source) is present. However, at some point, these influences might show a saturation behavior depending on the measurement technique. For example, static E/B fields shift energy levels of the atoms. If the shift is too large, a lasers which is involved in the detection/excitation process will no longer be resonant (and the shift is further increased, no further effect will be observed at some point)

In an implementation form, the least two quantum sensors are arranged at locations of the area with different power levels, in particular different amplitudes, of the EM radiation, such that at least one of the quantum sensors can detect a power level of the EM radiation if the other quantum sensor is in saturation. This achieves the advantage that the dynamic range of the quantum sensor system is enhanced.

In particular, a quantum sensor being in saturation may refer to the sensing volume of the quantum sensor being in saturation.

In an implementation form, the sensing volumes of the at least two quantum sensors each comprise a number of atoms in a ground state or an excited quantum state. For example, the atoms can be Rydberg atoms.

Each sensing volume can comprise a quantum system which is, e.g., formed by the respective number of atoms.

In an implementation form, at least one quantum sensor comprises a gas cell, wherein the number of atoms is stored in the gas cell in gaseous form.

For example, a sensing volume can comprise a continuum of atoms distributed along the gradient of the inhomogeneous EM field.

In an implementation form, the quantum sensor system comprises at least one light source configured to irradiate the sensing volumes of the at least two quantum sensors with a light beam, wherein the sensing volumes are optically excited by the light beam; and/or the quantum sensor system comprises at least one field generator unit configured to generate an electric and/or magnetic field within the sensing volumes of the at least two quantum sensors, wherein a resonance frequency of the number atoms in the sensing volumes is modified by an amplitude of the electric and/or magnetic field.

The field generator unit can be a capacitor to generate an electric field. The light source can comprise one or more lasers.

For instance, each quantum sensor may comprise a respective light source and a respective field generator to optically, electrically and/or magnetically excite atoms in the sensing volume.

The interaction of the EM radiation with the sensing volumes can be an excitation of resonant transitions between two energy states in the sensing volume.

In an implementation form, the sensing volumes of the at least two quantum sensors are arranged separate from each other.

In an implementation form, the sensing volumes of the at least two quantum sensors are arranged directly adjacent to each other and/or at least partially overlapping along a gradient of the inhomogeneous filed distribution of the EM radiation.

In an implementation form, the element comprises an antenna, such as a parabolic antenna.

In an implementation form, the element comprises an absorber which is configured to absorb at least a part of the EM radiation.

According to a second aspect, the disclosure relates to a method for sensing electromagnetic, EM, radiation. The method comprises the steps of: shaping and/or focusing the EM radiation to generate an inhomogeneous field distribution in an area; receiving the EM radiation with at least two quantum sensors which are arranged at different locations in the area, each of the quantum sensors comprising a sensing volume which is configured to interact with the EM radiation; detecting an interaction of the EM radiation with each sensing volume, wherein the respective interaction is indicative of a power level of the EM radiation at the location of the sensing volume; and determining a signal characteristic of the EM radiation based on a correlation of the power levels at the locations of the sensing volumes.

In an implementation form, the method comprises the further step of: generating the EM radiation based on a physical quantity to be analyzed.

In an implementation form, the least two quantum sensors are arranged at locations in the area with different power levels, in particular different amplitudes, of the EM radiation, such that at least one of the quantum sensors can detect a power level of the EM radiation if the other quantum sensor is in saturation.

In an implementation form, the sensing volumes comprise a number of atoms which are optically, magnetically and/or electrically exited to an excited quantum state. Alternatively, the number of atoms can be in a ground state.

According to a third aspect, the disclosure relates to a quantum sensor system for sensing electromagnetic, EM, radiation. The quantum sensor system comprises: a quantum sensor which is arranged to receive the EM radiation, wherein the quantum sensor comprises a sensing volume which is configured to interact with the EM radiation in at least two distinguishable ways based on at least two different species of atoms and/or at least two different atomic transitions; at least one detector configured to detect interactions of the EM radiation with the sensing volume in each of the at least two distinguishable ways; and a processor which is configured to determine a signal characteristic of the EM radiation based on a correlation of the detected interactions.

For instance, the quantum sensor system further comprises an element to shape and/or focus the EM radiation to generate an inhomogeneous field distribution in an area, wherein the quantum sensor is arranged in the area.

In an implementation form, the quantum sensor system further comprises a signal source which is configured to generate the EM radiation based on a physical quantity to be analyzed.

In an implementation form, the interactions of the EM radiation with the sensing volume comprise at least two different types of atomic transitions in the sensing volume in response to the EM radiation. The different atomic transitions can be an electric and a magnetic transition, or two transitions with slightly different resonant frequencies.

In an implementation form, the at least two different species of atoms interact with the EM radiation in the at least two distinguishable ways. The different species of atoms can comprise Rubidium and Caesium atoms.

In an implementation form, the quantum sensor system comprises a gas cell, wherein the at least two different species of atoms are stored in the gas cell in gaseous form.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
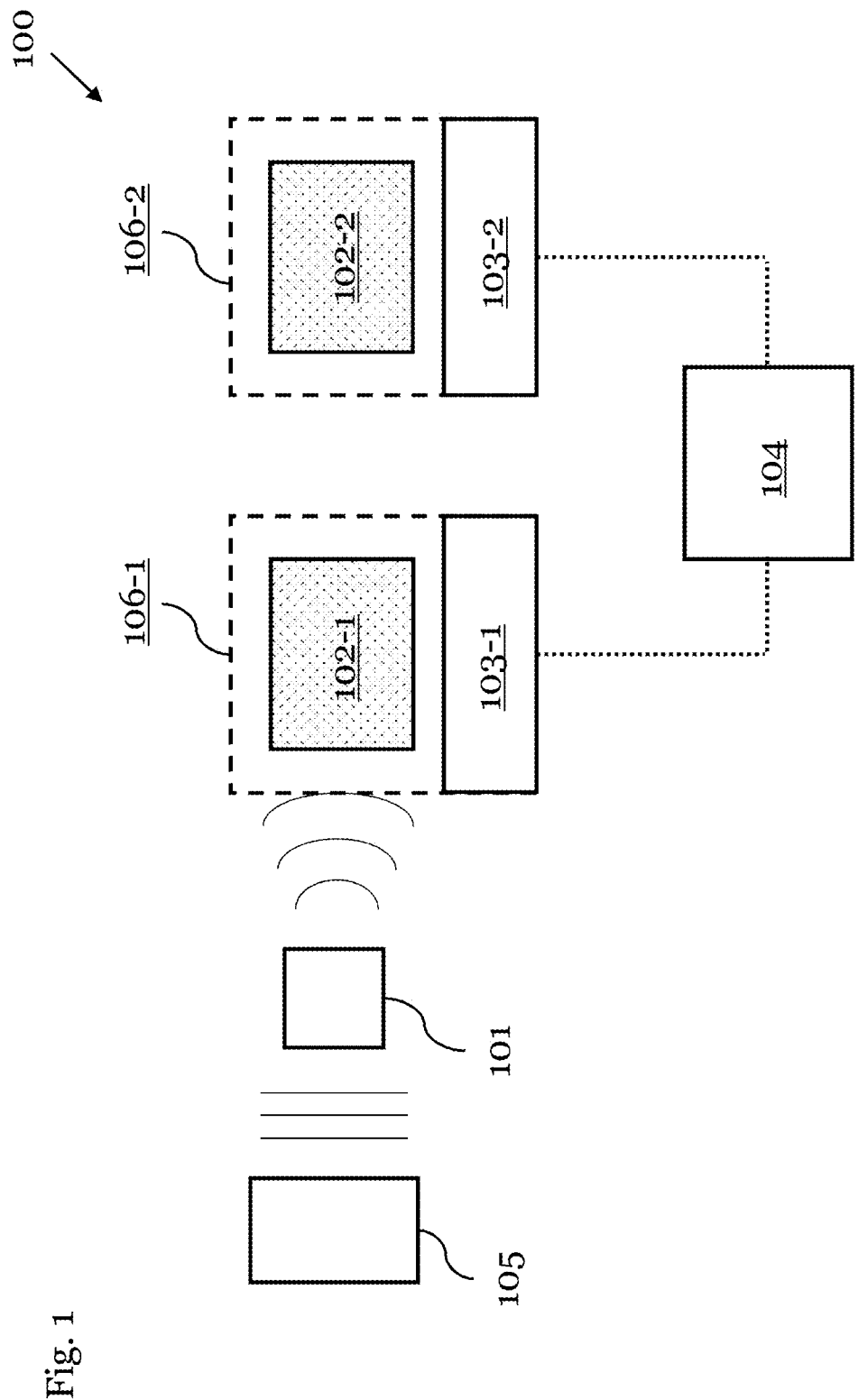
FIG. 1 shows a schematic diagram of a quantum sensor system for sensing EM radiation according to an embodiment.

FIG. 1 shows a schematic diagram of a quantum sensor system 100 for sensing EM radiation according to an embodiment.

The quantum sensor system 100 comprises an element 101 configured to shape and/or focus the EM radiation to generate an inhomogeneous field distribution in an area; and at least two quantum sensors 106-1, 106-2 which are arranged at different locations in the area, each of the quantum sensors 106-1, 106-2 comprising a sensing volume 102-1, 102-2 which is configured to interact with the EM radiation. The quantum sensor system 100 further comprises at least one detector 103-1, 103-2 configured to detect an interaction of the EM radiation with each sensing volume 102-1, 102-2, wherein the interaction is indicative of a power level of the EM radiation at the location of the respective sensing volume 102-1, 102-2; and a processor 104 which is configured to determine a signal characteristic of the EM radiation based on a correlation of the power levels at the locations of the sensing volumes 102-1, 102-2.

For instance, as shown in FIG. 1, each quantum sensor 106-1, 106-2 may comprise a sensing volume 102-1, 102-2 and a dedicated detector 103-1, 103-2 for the sensing volume 102-1, 102-2.

In particular, the power level of the EM radiation is related to its amplitude. Thus, the interaction of the EM radiation with each sensing volume 102-1, 102-2 is also indicative of the amplitude of the EM radiation at the location of the sensing volume 102-1, 102-2.

The processor 104 can be a microprocessor and/or a controller. The processor 104 can be configured to determine a relationship between the power levels received at the sensing volumes 102-1, 102-2 of the two quantum sensors 106-1, 106-2.

The quantum sensor system 100 may further comprise a signal source 105 which is configured to generate the EM radiation based on a physical quantity to be analyzed. The signal source 105 can comprise an antenna for transmitting the EM radiation.

The physical quantity can be an electric or magnetic field strength, a pressure or a temperature. The processor 104 can be configured to derive information on the physical quantity based on the determined signal characteristic of the EM radiation.

The quantum sensors 106-1, 106-2 and, in particular, the sensing volumes 102-1, 102-2 are arranged at two (or more) different positions, where the electromagnetic radiation has different field amplitudes and, thus, different power levels.

The sensing volumes 102-1, 102-2 can be arranged separate from each other, as shown in FIG. 1. Alternatively, the sensing volumes 102-1, 102-2 can be arranged directly adjacent to each other and/or at least partially overlap along a gradient of the inhomogeneous field distribution. Each sensing volume 102-1, 102-2 can comprise a quantum system.

When the sensing volume 102-1 at a first position with higher field amplitude shows a saturation behavior, additional information on the EM radiation can be acquired with the second sensing volume 102-2 at the second position (or other additional positions) with a lower field amplitude. Due to the lower field amplitude, the second sensing volume 102-2 withstand higher powers from the signal source until it reaches a saturation level. In this way, the dynamic range of the quantum sensor system 100 is enhanced.

To determine the signal characteristic based on a correlation of the power levels and/or to determine information on the physical quantity, the processor 104 can be configured to apply a calibration signal to the detected power levels. The calibration signal can sweep across various powers and frequencies. If a linear antenna is used to shape/focus the EM radiation, e.g. to a linear gradient, the calibration signal can be a single calibration curve.

The element 101 can be any means for shaping and/or focusing the EM radiation. For instance, the element 101 can be an RF device such as a waveguide or stripline with an evanescent field around it, a parabolic antenna, or an absorber arranged in the area. The element 101 can further comprise a medium (e.g., a space filled with air) which attenuates the field.

For instance, resonant transitions between two energy states in the sensing volumes 102-1, 102-2 can be used to detect the EM radiation: If the EM radiation is resonant (or near-resonant) to two energy levels in one of the sensing volumes 102-1, 102-2, it interacts with the sensing volume and changes the state of the sensing volume or a part thereof. However, other types of transitions can be utilized as well (e.g. ac stark shifts due to off-resonant interactions). The state of the atoms in the sensing volumes 102-1, 102-2 can be read out with different means (e.g. optical, or detection of EIT for Rydberg atoms).

Each of the sensing volumes 102-1, 102-2 can comprise a number of atoms in a ground state or an excited quantum state. For example, the excited atoms can be Rydberg atoms. The atoms can be Rubidium or Caesium atoms.

For instance, one or both of the sensing volumes 102-1, 102-2 may comprise a gas cell, wherein the number of atoms is stored in the gas cell in gaseous form.

Alternatively or additionally, at least one of the sensing volumes 102-1, 102-2 comprises a solid material, for example diamond, which comprises the number of atoms or atom like systems such as NV defects.

The at least one detector 103-1, 103-2 can comprise one or more optical detectors, e.g. cameras. The detector(s) 103-1, 103-2 can detect an optical change in the sensing volume(s) 102-1, 102-2 due to an interaction of the sensing volume(s) with the EM radiation.

Figure 2A:
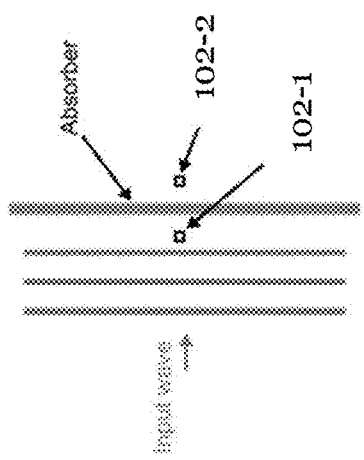
FIGS. 2A to 2C show different arrangements of a quantum sensor system according to an embodiment.
Figure 2B:
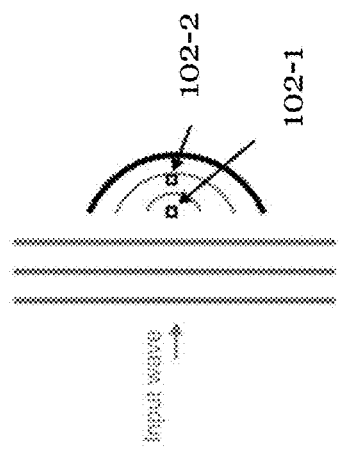
Figure 2C:
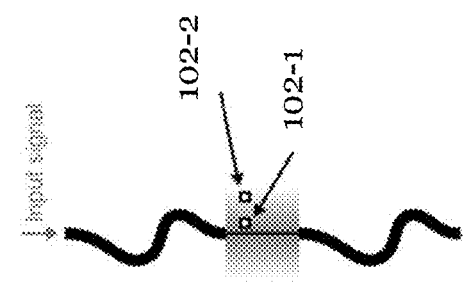

FIGS. 2A to 2C show different arrangements of the quantum sensor system 100 according to an embodiment. For the sake of simplicity, FIGS. 2A to 2C only show the sensing volumes 102-1, 102-2 of the quantum sensor system 100.

FIG. 2A shows a quantum sensor system 100 that is used to measure the power/voltage level of a signal that is contained in a cable or waveguide. In order to access the signal with the atoms in the sensing volumes 102-1, 102-2, the signal in the cable or waveguide can be converted to the electric or magnetic field distribution via an antenna. Alternatively, the sensing volumes 102-1, 102-2 can be brought close to the field of the cable or waveguide. It is then possible to measure the field at two (or more) different positions with two different amplitudes.

FIGS. 2B and 2C show cases where a far-field or homogeneous EM wave is analyzed. For instance, as shown in FIG. 2B, an inhomogeneous field distribution can be generated intentionally by focusing the EM input wave to a single spot via an antenna (not shown). Then, one sensing volume 102-1 can be placed at the focus of the antenna, and the other sensing volume 102-2 at a position with less amplitude. Alternatively, as shown in FIG. 2C, an absorber can be added instead, e.g. between the sensing volumes 101-1, 102-2. The absorber can absorb at least a portion of the EM signal, such that the sensing volume 101-2 behind the absorber receives the EM signal with a lower amplitude.

Figure 3:
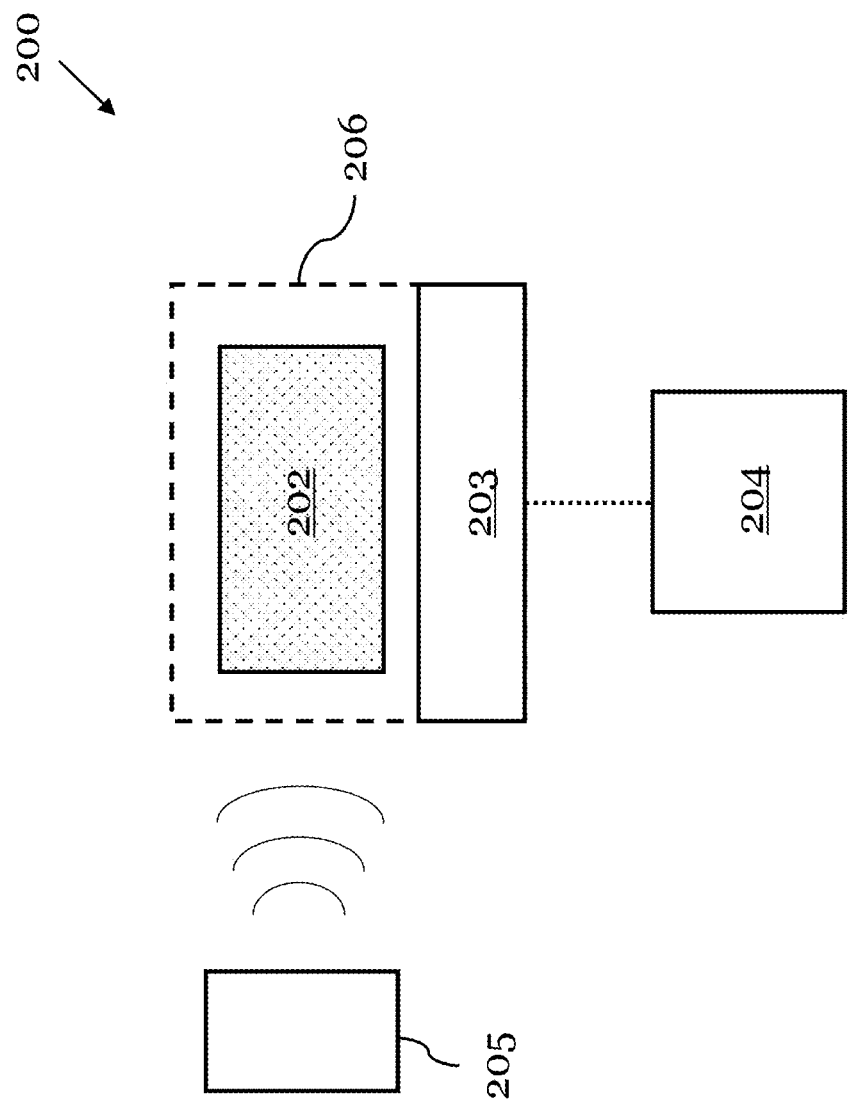
FIG. 3 shows a schematic diagram of a quantum sensor system for sensing EM radiation according to an embodiment.

FIG. 3 shows a schematic diagram of a quantum sensor system 200 for sensing EM radiation according to an embodiment.

The quantum sensor system 200 comprises a quantum sensor 206 which is arranged to receive the EM radiation, wherein the quantum sensor 206 comprises a sensing volume 202 which is configured to interact with the EM radiation in at least two distinguishable ways based on at least two different species of atoms and/or at least two different atomic transitions. The quantum sensor system 200 further comprises at least one detector 203 configured to detect interactions of the EM radiation with the sensing volume 202 in each of the at least two distinguishable ways; and a processor 204 which is configured to determine a signal characteristic of the EM radiation based on a correlation of the detected interactions.

Thus, instead of measuring the response of two (or more) separate sensing volumes, as it is done with the system 100 shown in FIG. 1, the system 200 uses a single, potentially larger, sensing volume containing different (more or less)

stationary quantum systems to perform a spatially resolved measurement of the sensor response.

The processor 204 can be a microprocessor and/or a controller.

The quantum sensor system 200 may further comprise a signal source 205 which is configured to generate the EM radiation based on a physical quantity to be analyzed. The signal source 205 can comprise an antenna for transmitting the EM radiation The interactions of the EM radiation with the sensing volume 202 may comprise at least two different types of atomic transitions in the sensing volume, such as an electric and a magnetic transition, or two transitions with slightly different resonant frequencies.

For instance, a first transition is resonant to the EM field and a second transition is not exactly resonant which reduces the transition strength relative to the first transition. Alternatively or additionally, the transitions could be distinguished by the polarization of the EM field.

The at least two different species of atoms are preferably arranged in the same sensor volume of the quantum sensor 206. For instance, the quantum sensor system 200 comprises a gas cell, wherein the different species of atoms are arranged in the gas cell in gaseous form. The species of atoms can comprise Rubidium and Caesium.

For instance, the different transitions in the same sensor volume have a different transitions strength and can be distinguished in the readout scheme. For instance, the different resonant transitions required different energies. Thus, if one of the resonant transitions is in saturation due to a high signal level of the EM radiation, the other (weaker) transition can still be used to measure the signal level (and/or amplitude) of the EM radiation. In this way, the dynamic range of the quantum sensor system 200 is enhanced.

The EM signal characteristics and/or the physical quantity can be calculated based on the correlation of the detected interactions theoretically (e.g., via a mathematical model) or by means of a calibration curve.

The detector 203 of the system 200 can be an optical detector, e.g. a camera, which can detect optical changes in the sensing volume 202 due to the interactions.

The measurement schemes shown in FIGS. 1-3 combine a high sensitivity with the ability to characterize strong EM signals due to a high dynamic range. For instance, no conventional attenuators, which would reduce the sensitivity of the measurements, are used.

Figure 4:
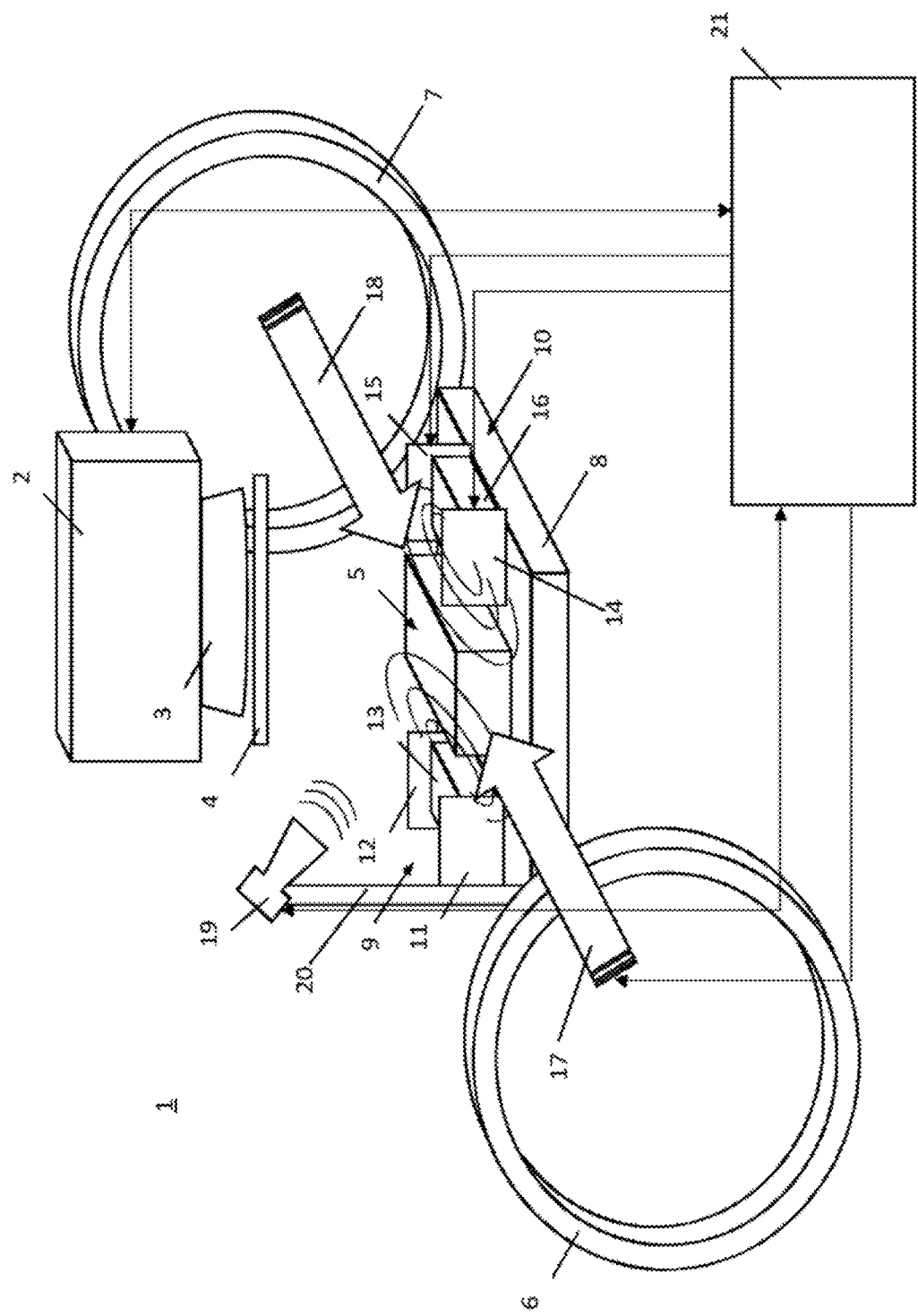
FIG. 4 shows a schematic diagram of a quantum sensor according to an embodiment.

FIG. 4 shows a schematic diagram of a quantum sensor 1 according to an embodiment. In an example, each of the quantum sensors 106-1, 106-2 of the system 100 in FIG. 1 or the quantum sensor 206 of the system 200 in FIG. 3 can be configured according to the quantum sensor 1 shown FIG. 4. The sensing volume of the exemplary sensor 1 shown in FIG. 4 is formed by an enclosure 5 storing a gas of, e.g., Caesium atoms. For the quantum sensor system 200 shown in FIG. 3, an addition gas species can be present in the enclosure 5, e.g., Rubidium.

The quantum sensor 1 comprises a camera 2 equipped with a lens system 3 for capturing fluorescent light that is emitted by a gas provided in a hermetically sealed enclosure 5. The light that is emitted by the gas atoms contained in the gas inside the enclosure 5 may be filtered by a filter 4 that is adjusted to let the fluorescent light pass. The enclosure 5 is arranged between a pair of permanent magnet rings 6 and 7 as magnetic field source. It is to be noted that any type of magnetic field source, specifically coils, may be used. In case of using coils it is possible to control the strength of the field by its driver. The enclosure 5 is placed on a base plate 8, which in the simplest case may be provided for supporting reasons only. However, according to a preferred embodiment, the base plate 8 may be heated such that the enclosure 5 and, thus, the gas contained in it can be maintained at a desired and preferably constant temperature, which is for example 60° C. In case that the gas contains Caesium atoms as the responsive atoms for conducting the measurement. At 60° C., the Caesium atoms are in the gas phase.

The quantum sensor 1 comprises a source for an electrical field, which is in the illustrated embodiment a pair of capacitors 9, 10 arranged at opposite sides of the enclosure 5. The capacitors 9, 10 each comprise a pair of electrodes 11, 12 and 14, 15 respectively, with a dielectric material 13 and 16 placed between them. The capacitors 9, 10 generate an electrical field which is static but inhomogeneous in the area of the enclosure 5. Towards the symmetry axis, the strength of the electrical field increases.

It is to be noted that the pair of magnetic rings 6, 7 defines an axis for the quantization states and the relative direction of the electrical field influences the Stark shift. In the illustrated embodiment, which is a preferred arrangement, the direction of the magnetic field and the electrical field are substantially parallel.

The gas atoms in the enclosure 5 are so called Rydberg atoms that are excited by a plurality of laser beams, indicated with reference numeral 17 and 18 in the drawing. The lasers are operated for example at a wave length of approximately 850 nm, 852 nm and 1470 nm in case of using three lasers as light sources in order to excite the outer electrons of the gas atoms of the active gas portion in the enclosure 5 into the Rydberg state.

The electromagnetic radiation to be measured is emitted by an antenna 19, which preferably is a horn antenna so that the radiation can be focused inside the enclosure 5. In order to avoid any relative displacement of the antenna 19 with respect to the enclosure 5, a post is provided on the base plate 8 supporting the antenna 19.

For improving the dynamic range, a decreasing intensity of the electromagnetic radiation towards the outer surface of the enclosure 5 is desired and the capacitors 9 and 10 are controlled accordingly.

In order to analyze the electromagnetic radiation emitted by the antenna 19, the camera 2 captures the fluorescent light emitted by the gas atoms, in the preferred embodiment Caesium atoms. Since the electrical field generated by the capacitors 9 and 10 varies with the location inside the enclosure 5, the resonance frequency for the electromagnetic radiation may depend on the location. Since the camera 2 generates an image that is two-dimensional, the intensity of the fluorescent light is captured with a special resolution. Thus, one dimension of the two-dimensional image reflects the frequency information whereas the other dimension shows a gradient of intensity for improving the dynamic range. For the arrangement shown in FIG. 4 it is preferred that source of the electromagnetic radiation, the electrical field source and the camera 2 are controlled simultaneously, i.e. an image is captured while the electrical field is applied to the gas in the enclosure 5 and while the electromagnetic radiation to be measured also acts on the gas atoms.

It is to be noted, that according to the preferred way of carrying out the invention, the fluorescent light emitted by the Caesium atoms is captured. It is also possible to capture laser light that is transmitted through the gas in the enclosure 5. The controller 21 controls the camera 2, the laser sources 17 and 18, emission of the radiation to be analyzed and further adjusts the strength of the electrical field by controlling the capacitors 9 and 10. In particular, a change of the electrical field strength and operation of the microwave emitter, namely the antenna 19, is controlled by the controller 21. Such a switching of the electrical field and the microwave emission by the antenna 19 might be necessary when a narrowband laser is used and no or at least little additional gas is contained in the enclosure 5. Switching of the electrical field and of the electromagnetic radiation can be necessary since otherwise a narrowband laser and the gas in the enclosure 5 would no longer be resonant due to the Stark shift.

Alternatively, using a broadband laser as a light source (e.g. more than 30 GHz) would render the switching of the electrical field unnecessary. The same effect may be achieved by increasing the amount of additional gas atoms in the enclosure 5. Thus, by adjusting the amount of "active" gas atoms (Rydberg atoms) and additional gas atoms of a different type (filler gas), the desired line broadening can be set. It is preferred to use an increased amount of filler gas because the filler gas at the same time is used to prevent undesired movements of the active gas atoms during measurement.

However, other types of quantum sensors could also be used for the quantum sensors 106-1, 106-2 of the system 100 in FIG. 1 or the quantum sensor 206 of the system 200 in FIG. 3.

Figure 5:
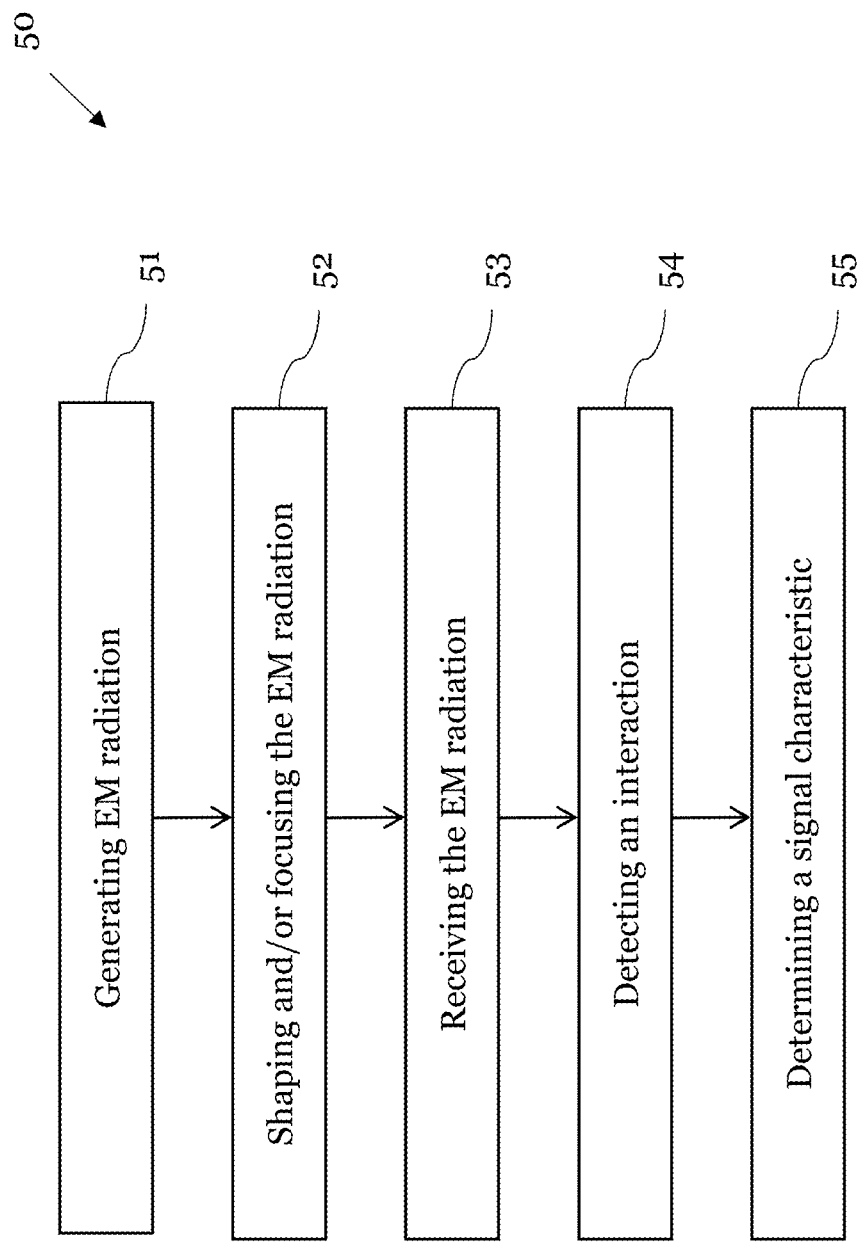
FIG. 5 shows a flow diagram of a method for sensing EM radiation according to an embodiment.

FIG. 5 shows a flow diagram of a method 50 for sensing EM radiation according to an embodiment. The method 50 can be carried out by the quantum sensor system 100 shown in FIG. 1.

The method 50 comprises: shaping 52 and/or focusing the EM radiation to generate the inhomogeneous field distribution in the area; receiving 53 the EM radiation with at least two quantum sensors 106-1, 106-2 which are arranged at different locations in the area, each of the quantum sensors 106-1, 106-2 comprising a sensing volume 102-1, 102-2 which is configured to interact with the EM radiation; detecting 54 an interaction of the EM radiation with each sensing volume 102-1, 102-2, wherein the respective interaction is indicative of a power level of the EM radiation at the location of the sensing volume 102-1, 102-2; and determining 55 the signal characteristic of the EM radiation based on a correlation of the power levels at the locations of the sensing volumes 102-1, 102-2.

As a first step, the method 50 may further comprise the step of generating 51 the EM radiation based on the physical quantity to be analyzed.

The least two quantum sensors 106-1, 106-2 can be arranged at locations in the area with different power levels, in particular different amplitudes, of the EM radiation, such that at least one of the quantum sensors can detect a power level of the EM radiation if the other quantum sensor is in saturation.

The sensing volumes 102-1, 102-2 can comprise a number of atoms which are optically, magnetically and/or electrically exited to an excited quantum state.

Figure 6:
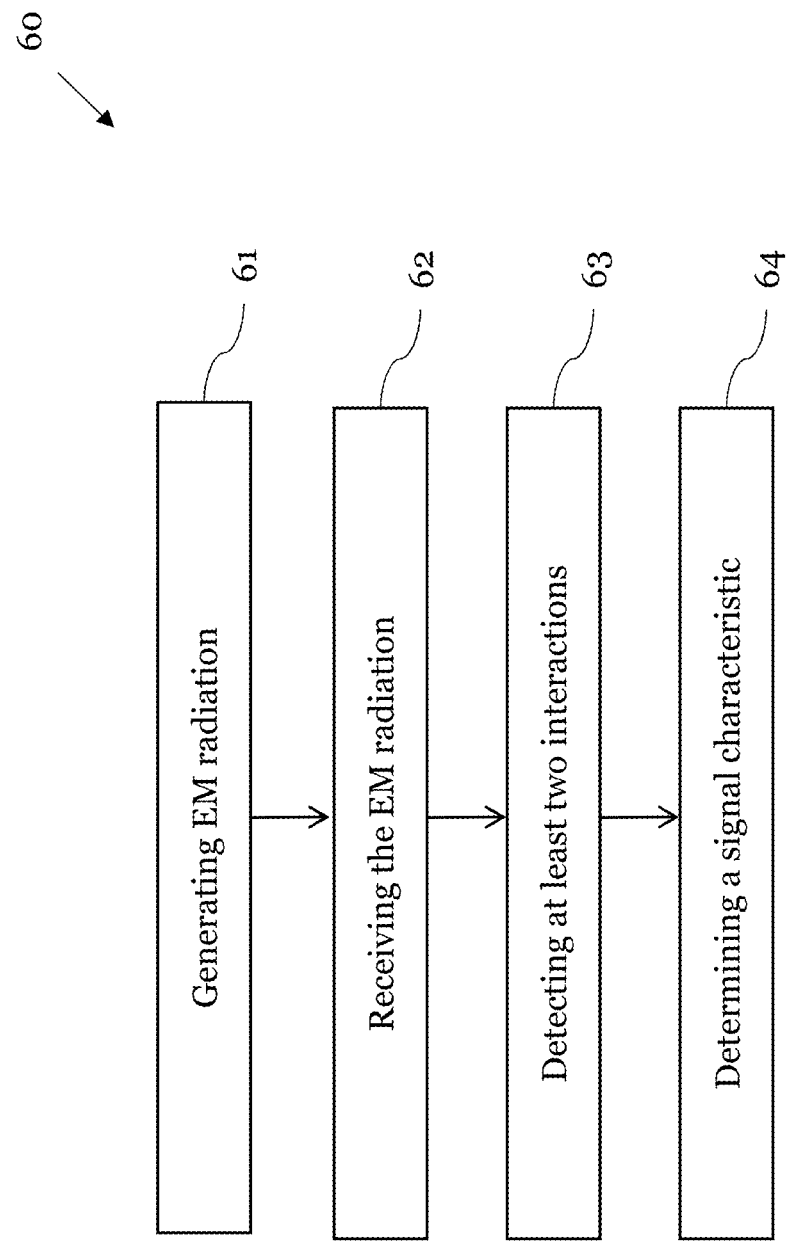
FIG. 6 shows a flow diagram of a method for sensing EM radiation according to an embodiment.

FIG. 6 shows a flow diagram of a method 60 for sensing EM radiation according to an embodiment. The method 60 can be carried out by the quantum sensor system 200 shown in FIG. 3.

The method 60 comprises the steps of: receiving 62 the EM radiation with a quantum sensor 206, wherein the quantum sensor 206 comprises a sensing volume 202 which is configured to interact with the EM radiation in at least two distinguishable ways based on at least two different species of atoms and/or at least two different atomic transitions; detecting 63 interactions of the EM radiation with the sensing volume 202 in each of the at least two distinguishable ways; and determining 64 a signal characteristic of the EM radiation based on a correlation of the detected interactions.

As a first step, the method 60 may further comprise: generating 61 the EM radiation based on the physical quantity to be analyzed.

All features described above or features shown in the figures can be combined with each other in any advantageous manner within the scope of the disclosure.

The invention claimed is:

1. A quantum sensor system for sensing electromagnetic, EM, radiation, comprising:
    an element configured to shape and/or focus the EM radiation to generate an inhomogeneous field distribution in an area;
    at least two quantum sensors which are arranged at different locations in the area, each of the quantum sensors comprising a sensing volume which is configured to interact with the EM radiation;
    at least one detector configured to detect an interaction of the EM radiation with each sensing volume, wherein the interaction is indicative of a power level of the EM radiation at the location of the respective sensing volume; and
    a processor which is configured to determine a signal characteristic of the EM radiation based on a correlation of the power levels at the locations of the sensing volumes.

2. The quantum sensor system of claim 1, further comprising:
    a signal source which is configured to generate the EM radiation based on a physical quantity to be analyzed.

3. The quantum sensor system of The quantum sensor system of wherein the at least two quantum sensors are arranged at locations in the area with different power levels, in particular different amplitudes, of the EM radiation, such that at least one of the quantum sensors can detect a power level of the EM radiation if the other quantum sensor is in saturation.

4. The quantum sensor system of claim 1,
    wherein the sensing volumes of the at least two quantum sensors each comprise a number of atoms in a ground state or an excited quantum state.

5. The quantum sensor system of claim 4,
    wherein at least one quantum sensor comprises a gas cell, wherein the number of atoms is stored in the gas cell in gaseous form.

6. The quantum sensor system of claim 4, further comprising:
    at least one light source configured to irradiate the sensing volumes of the at least two quantum sensors with a light beam, wherein the sensing volumes are optically excited by the light beam; and/or
    at least one field generator unit configured to generate an electric and/or magnetic field within the sensing volumes of the at least two quantum sensors, wherein a resonance frequency of the number atoms in the sensing volumes is modified by an amplitude of the electric and/or magnetic field.

7. The quantum sensor system of claim 1,
    wherein the sensing volumes of the at least two quantum sensors are arranged separate from each other.

8. The quantum sensor system of claim 1,
    wherein the sensing volumes of the at least two quantum sensors are arranged directly adjacent to each other and/or at least partially overlapping along a gradient of the inhomogeneous filed distribution of the EM radiation.

9. The quantum sensor of claim 1, wherein the element comprises an antenna, such as a parabolic antenna.

10. The quantum sensor of claim 1, wherein the element comprises an absorber which is configured to absorb at least a part of the EM radiation.

11. A method for sensing electromagnetic, EM, radiation, comprising the steps of:
shaping and/or focusing the EM radiation to generate an inhomogeneous field distribution in an area;
receiving the EM radiation with at least two quantum sensors which are arranged at different locations in the area, each of the quantum sensors comprising a sensing volume which is configured to interact with the EM radiation;
detecting an interaction of the EM radiation with each sensing volume, wherein the respective interaction is indicative of a power level of the EM radiation at the location of the sensing volume; and
determining a signal characteristic of the EM radiation based on a correlation of the power levels at the locations of the sensing volumes.

12. The method of claim 11, further comprising the step of:
generating the EM radiation based on a physical quantity to be analyzed.

13. The method of claim 11, wherein the least two quantum sensors are arranged at locations in the area with different power levels, in particular different amplitudes, of the EM radiation, such that at least one of the quantum sensors can detect a power level of the EM radiation if the other quantum sensor is in saturation.

14. The method of claim 11, wherein the sensing volumes comprise a number of atoms which are optically, magnetically and/or electrically exited to an excited quantum state.

15. A quantum sensor system for sensing electromagnetic, EM, radiation, comprising:
a quantum sensor which is arranged to receive the EM radiation, wherein the quantum sensor comprises a sensing volume which is configured to interact with the EM radiation in at least two distinguishable ways based on at least two different species of atoms and/or at least two different atomic transitions;
at least one detector configured to detect interactions of the EM radiation with the sensing volume in each of the at least two distinguishable ways; and
a processor which is configured to determine a signal characteristic of the EM radiation based on a correlation of the detected interactions.

16. The quantum sensor system of claim 15, further comprising:
a signal source which is configured to generate the EM radiation based on a physical quantity to be analyzed.

17. The quantum sensor system of claim 15, wherein the interactions of the EM radiation with the sensing volume comprise at least two different types of atomic transitions in the sensing volume in response to the EM radiation.

18. The quantum sensor system of claim 15, wherein the at least two different species of atoms interact with the EM radiation in the at least two distinguishable ways.

19. The quantum sensor system of claim 15, wherein the quantum sensor system comprises a gas cell, wherein the at least two different species of atoms are stored in the gas cell in gaseous form.

* * * * *